United States Patent [19]

Hyde, Jr.

[11] Patent Number: 5,426,948
[45] Date of Patent: Jun. 27, 1995

[54] MULTIFORM SOLID CARBON DIOXIDE EXTRUDER

[76] Inventor: Charles M. Hyde, Jr., 1435 Ventura Dr., Box 246, Cumming, Ga. 30130

[21] Appl. No.: 312,394
[22] Filed: Sep. 26, 1994
[51] Int. Cl.6 ............................................. B29C 43/00
[52] U.S. Cl. ............................................... 62/35; 62/10
[58] Field of Search ...................................... 62/10, 35

[56] References Cited

U.S. PATENT DOCUMENTS

| 2,120,943 | 6/1938 | Schutz | 62/35 |
|---|---|---|---|
| 2,145,096 | 1/1939 | Schutz | 62/35 X |
| 3,576,112 | 3/1971 | Frost et al. | 62/35 |
| 3,618,330 | 11/1971 | Hardt | 62/35 X |
| 3,670,516 | 6/1972 | Duron et al. | 62/35 |
| 3,708,993 | 1/1973 | Hardt et al. | 62/35 |
| 3,835,657 | 9/1974 | Scudder | 62/35 |
| 4,033,736 | 7/1977 | Cann | 62/35 |
| 4,412,852 | 11/1983 | Umino et al. | 62/35 |
| 4,727,687 | 3/1988 | Moore | 62/35 X |
| 4,780,119 | 10/1988 | Brooke | 62/35 |
| 5,135,553 | 8/1992 | Rebhan | 62/35 |
| 5,249,426 | 10/1993 | Spivak et al. | 62/35 |
| 5,257,503 | 11/1993 | Rhoades et al. | 62/35 |
| 5,301,509 | 4/1994 | Lloyd et al. | 62/35 |
| 5,385,023 | 1/1995 | Montemayor et al. | 62/35 X |

FOREIGN PATENT DOCUMENTS

| 2654717 | 5/1991 | France | 62/35 |
|---|---|---|---|
| 0005314 | 1/1981 | Japan | 62/35 |
| 6054217 | 5/1981 | Japan | 62/35 |
| 0131818 | 7/1985 | Japan | 62/35 |
| 2307819 | 12/1990 | Japan | 62/35 |

Primary Examiner—Christopher Kilner
Attorney, Agent, or Firm—Richard C. Litman

[57] ABSTRACT

The present invention is an apparatus for extruding various shapes and sizes of solid carbon dioxide units. The apparatus includes a computer-controlled extruder including removable dies for fabricating a wide range of dry ice shapes. A dagger board is provided for sectioning the extruded dry ice into desired lengths. Additionally, a linear voltage distance transducer coupled to the extrusion ram, in cooperation with pressure sensors in the extruding chamber, provide information to allow dry ice units having consistent density throughout to be fabricated.

15 Claims, 4 Drawing Sheets

MULTIFORM SOLID CARBON DIOXIDE EXTRUDER

BACKGROUND OF THE INVENTION

1. Field of the Invention

The present invention relates to an apparatus for forming and extruding solid carbon dioxide blocks. More specifically, the present apparatus provides for the manufacture of solid carbon dioxide having consistent density throughout in a variety of different shapes and sizes.

2. Description of the Prior Art

The basic process for fabricating solid carbon dioxide (dry ice) blocks from liquid carbon dioxide has long been known. First, liquid carbon dioxide is forced through a small nozzle and allowed to expand into a sealed chamber. Adiabatic expansion of the liquid carbon dioxide freezes it into a solid. The solid carbon dioxide then precipitates into the chamber as a fine carbon dioxide snow. (This process is commonly called "flashing.") The dry ice is then normally compressed into blocks of known weight for sale to consumers.

For instance, the apparatus described in U.S. Pat. No. 3,576,112, issued Apr. 27, 1971, to Frost et al, is a typical device. Liquid carbon dioxide is flashed into a closed chamber having a reciprocating ram and a perforated head. The solid and gaseous carbon dioxide present in the chamber after flashing are pushed by the ram through the perforated head, and the carbon dioxide gas is vented from the chamber. The remaining dry ice is then continuously compressed into usable blocks and ejected from the flashing chamber. Here, the device is continuous in that the block of dry ice being extruded actually forms a seal between the flashing chamber and the atmosphere. As the compressed dry ice is pushed from the chamber, new dry ice is packed in its place, thereby effectively sealing the flash chamber from the ambient environment.

Duron et al describe a continuous dry ice pelletizing apparatus which operates in a rotary fashion in U.S. Pat. No. 3,670,516, issued Jun. 20, 1972. In this device, the liquid carbon dioxide is flashed into a chamber which is located directly above an interior ring gear. The ring gear has openings extending radially therethrough which act as small extrusion chambers. A concentrically mounted pinion meshes with the teeth of the interior ring gear in a planetary fashion, which forces the dry ice into the radial openings in the ring gear. As the pinion makes its way around the interior of the ring gear, the falling dry ice from the chamber above is gradually extruded as pellets from the outer circumference of the ring gear.

U.S. Pat. No. 3,708,993, issued Jan. 9, 1973, to Hardt et al, describes an apparatus for forming carbon dioxide pellets of high density which readily break into small pieces, yet do not agglomerate during shipment. The object of this apparatus is diametrically opposed to that of the present invention in that the pellets formed by the apparatus are designed with the specific intent to crumble. The present invention, however, is designed to fabricate dry ice shapes which have consistent density and will have the tendency not to be frangible. The apparatus described by Hardt et al is of the reciprocating plunger type, and forms an extruded rod of dry ice having radiating projections extending from an axial core. The core of the extruded rod has oblique fracture lines which extend completely around the core. The rod has a high density, yet will readily shatter into smaller pieces when forcibly struck. The rods are shipped intact, and then broken into smaller pieces by the end user, thereby avoiding agglomeration of the pieces during shipment.

Cann describes a dry ice extrusion apparatus which applies back pressure to the extruded dry ice in U.S. Pat. No. 4,033,736, issued Jul. 5, 1977, As discussed further below, gaseous carbon dioxide trapped within a solid extrusion causes the solid dry ice form to shattered due to the expansion of the trapped gas. The device described by Cann is a conventional extruder which applies contact pressure to an extruded dry ice rod immediately after it has been forced from the extruder. This allows the trapped carbon dioxide to diffuse from the rod, while the rod is prevented from shattering by the applied back pressure. The dry ice solid formed by the process, however, is not solid ice, but instead has a porous appearance.

U.S. Pat. No. 4,412,852, issued Nov. 1, 1983, to Umino et al describes an apparatus for producing brick shaped blocks of dry ice. The apparatus has two compartments, a pre-compression compartment located above a press mold compartment. In the upper pre-compression compartment, liquid carbon dioxide is flashed into carbon dioxide snow, and then pressed into a loose brick to drive off trapped gaseous carbon dioxide. The pre-compressed block is then dropped through a shuttered passageway to the press mold, where it is fully compressed into a dry ice brick. The apparatus does not allow for the formation of various shapes of dry ice forms, but only make dry ice bricks.

Yet another apparatus for fabricating dry ice shapes, this time into discs, is described in U.S. Pat. No. 4,780,119, issued Oct. 25, 1988, to Brooke. Here, an extruder forces dry ice snow through a fixed die. The pellets so produced are then gravity fed into a hydraulic forming chamber where the extruded pellets are compressed into discs. The apparatus described in this reference has a fixed die, and can therefore produce dry ice units of only one shape.

Spivak et al describe an apparatus for both making and delivering dry ice pellets in U.S. Pat. No. 5,249,426, issued Oct. 5, 1993. In this device, a rotary extruder compresses dry ice into pellets, which fall into a hopper at the bottom of the device. Gaseous carbon dioxide recovered under pressure from the extruder is then used to propel the dry ice pellets along a conduit to a movable container or storage tank.

U.S. Pat. No. 5,257,503, issued Nov. 2, 1993, to Rhoades et al describes an apparatus for the low pressure formation of dry ice units. High density dry ice bricks are formed by first introducing liquid carbon dioxide into a mold at a first low pressure for a selected period of time. Liquid carbon dioxide is then introduced into the mold at a higher pressure for a second period of time. The carbon dioxide introduced at the lower pressure forms a very light dry ice snow, which partially fills the mold. The carbon dioxide introduced at the higher pressure remains a liquid for a sufficient amount of time to saturate the low density snow already present in the mold. When this liquid carbon dioxide becomes solid due to the adiabatic expansion of part of the carbon dioxide, the liquid carbon dioxide-saturated dry ice solidifies into a high density dry ice brick. The dry ice brick so formed is not extruded in any manner.

U.S. Pat. No. 5,301,509, issued Apr. 12, 1994, to Lloyd et al describes an apparatus for producing dry ice particles for dry ice particle sand blasting. Dry ice is first liquefied and then transported via a snow barrel to a plurality of die openings. The liquid carbon dioxide is the converted back into dry ice by back pressure on the die. Forward pressure from super viscous liquid carbon dioxide entering the die openings forces the newly formed dry ice pellets out of the dies and into a transportation stream where they are carried to an application nozzle for sand blasting.

SUMMARY OF THE INVENTION

Solid carbon dioxide, originally sold under the trademark Dry Ice, and now commonly referred to as dry ice, is a commodity refrigerant which is widely used by the scientific community as well as the food-handling and packing industry, and in metallurgy. At atmospheric pressure, dry ice has a temperature of $-109.33°$ F., and a refrigeration value of 246.25 BTU's per pound. The solid readily sublimes at atmospheric pressure.

Liquid carbon dioxide can be formed at reduced temperatures and elevated pressures. For instance, liquid carbon dioxide is normally transported in refrigerated tanks at a pressure of 300 pounds per square inch. If allowed to adiabatically expand from the liquid state, the carbon dioxide will partially evaporate to a gas. The evaporating portion will carry away sufficient heat from the remaining carbon dioxide to solidify it. This process is referred to industrially as flashing. If flashed to atmospheric pressure, slightly more than half of the mass of carbon dioxide will evaporate to gaseous carbon dioxide, while slightly less than half of the mass will solidify and precipitate as carbon dioxide snow.

A frequently encountered problem when forming dry ice shapes is the ready sublimation of the dry ice at atmospheric pressure. When dry ice is being compacted and extruded, for instance, gaseous carbon dioxide is often trapped within the mass of dry ice being compressed. When the finished block exits the extruder, the trapped gas will expand, causing the block to splinter and crumble. This can be particularly troublesome when large blocks of dry ice are desired, or large blocks are being transported prior to being subdivided.

Another frequently encountered problem in fabricating dry ice is that different consumers of dry ice require different sizes and shapes of the solid. This can be troublesome for the consumer in that if large amounts of dry ice are needed, and the dry ice must be of a particular shape, in order to lower cost per BTU the consumer will often purchase large blocks of dry ice (the industry standard block weighs 240 pounds). The consumer will then cut the blocks to fit his particular application. The problem faced by the consumer is that while he realizes a cost savings per BTU in terms of the gross weight of dry ice purchased, a significant amount of the dry ice will sublime in the process of cutting the large block into the desired smaller shapes. Additionally, to cut a 240 pound block of dry ice requires a 36 inch band saw, which is both expensive and dangerous considering the inherent risks of freeze burns or suffocation when dealing with large quantities of dry ice.

The present invention is a computer controlled dry ice extruder which will fabricate large or small blocks of dry ice, dry ice sheets, dry ice pellets, and the like. The dry ice formed in the extruder has a consistent density, regardless of the shape being formed. Now, rather than forcing the consumer to shape the dry ice after purchase, using the presently claimed apparatus, a dry ice manufacturer can fabricate high quality dry ice in any shape desired by the consumer.

In summary, the apparatus comprises a liquid carbon dioxide source, an extruder with a number of pressure and linear distance sensors therein, a die head with replaceable dies, and a computer controller to coordinate operation of the apparatus to produce dry ice having a consistent density. In general operation, the liquid carbon dioxide is flashed into a sealed extruder chamber through an inlet, where it solidifies into dry ice. A ram then compresses the dry ice against a dagger board which defines one wall of the extruder chamber. This forms an initial compacted block of dry ice. Simultaneously with the compression of the dry ice, gaseous carbon dioxide is filtered out of the extrusion chamber through an outlet. (The gaseous carbon dioxide can be filtered and then recirculated into a carbon dioxide liquefier for re-injection into the extruder.)

When the dry ice is sufficiently compacted, the dagger board is withdrawn from the extrusion chamber to reveal an opening into which can be placed a removable die designed to form dry ice in units of any desired shape. For instance, the die could be designed to form blocks, or pellets, or sheets, or the like. The ram is then used to force the compressed dry ice through the now-exposed die, thereby extruding the dry ice into the desired units. A sharpened edge of the dagger board is used to cut the compressed dry ice into pieces of the desired size.

To control the density of the dry ice being compacted and extruded, preferably three sensors within the extrusion chamber and a linear voltage distance transducer (LVDT) connected to the piston which drives the ram are coupled to a computer controller. At Least one pressure sensor is placed within the extrusion chamber to measure the pressure therein. Pressure sensors are also placed at the liquid carbon dioxide inlet, and at the gaseous carbon dioxide outlet to measure the gas pressure at these locations. This information is then fed to a computer controller, which also receives information from the LVDT attached to the ram.

The LVDT produces an electric signal proportional to the linear distance travelled by the ram. Using feedback information from the various pressure sensors, the rate and distance of travel of the ram can be accurately controlled to ensure that substantially all of the gaseous carbon dioxide is vented from the extrusion chamber as the dry ice is compacted into the initial compacted block. This results in a consistently dense block of dry ice because there is little or no gaseous carbon dioxide trapped within the dry ice block.

Once the initial dry ice block has been formed, the dry ice is extruded through a die to give the desired end shape. With recirculating apparatus in place, very little carbon dioxide is vented to the atmosphere. Additionally, very little product dry ice is wasted because the dry ice can now be custom extruded according to consumers' needs.

In light of the above discussion, it is therefore an object of the present invention to provide an apparatus which will produce solid carbon dioxide in a variety of shapes and sizes.

It is another object of the present invention to provide an apparatus which will produce solid carbon dioxide shapes having consistent density throughout.

It is yet another object of the present invention to provide an apparatus which will allow a user to produce variable sizes of solid carbon dioxide blocks, solid carbon dioxide sheets, and solid carbon dioxide pellets using the same apparatus.

DETAILED DESCRIPTION OF THE PREFERRED EMBODIMENT

Figure 1:
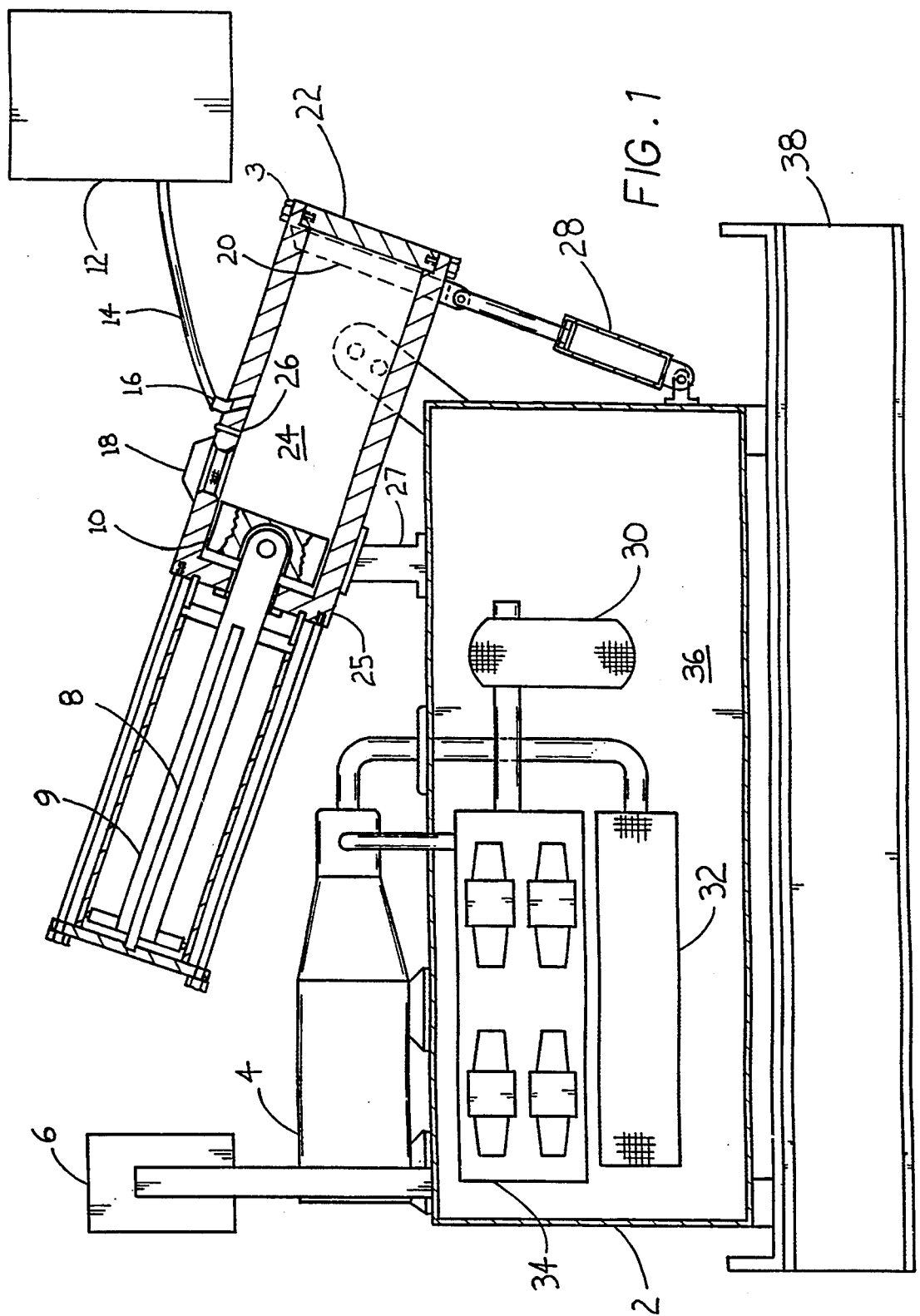
FIG. 1 is a front elevation of the present solid carbon dioxide extruder.

Reference is made herein to the attached drawings. Identical reference numerals are used throughout the various views contained in the drawings to designate identical or similar elements of the claimed invention.

FIG. 1 depicts a front view in elevation of the presently claimed dry ice extruding apparatus. Extruder 25 having chamber 24 is shown mounted on hydraulic tank 2 via operational connector 27. Hydraulic tank 2 is mounted on a conventional base or skid 38. A compacting assembly which traverses the distance of extrusion chamber 24 includes powered ram 10 and connecting rod 9.

The interior 36 of hydraulic tank 2 contains a hydraulic assembly to power the extruder 25 and dagger ram 28, and includes filter 30, suction filter 32 and valve block 34. Located directly above hydraulic tank 2 is a hydraulic motor 4 for powering the entire extruding apparatus. Such hydraulic assemblies are conventional and well known.

Liquid carbon dioxide from reservoir 12 is flashed into chamber 24 via conduit 14 connecting the reservoir to inlet 16. Sensor 26 monitors the pressure within chamber 24. Carbon dioxide as, which is vented from the chamber 24 during compaction of the solid carbon dioxide is vented through outlet 18. The outlet can be connected to an assembly for recirculating the vented carbon dioxide gas back into reservoir 12 (not shown). An electrically responsive linear distance sensor 8, preferably a linear voltage distance transducer (LVDT), is operationally coupled to the connecting rod 9 of powered ram 10.

Dagger board 20, connected to dagger ram 28, forms a movable closure of one end of the chamber 24. The dagger board is movable between a closed position, shown, and an opened position in which the dagger board is substantially removed from the chamber 24. When the dagger board 24 is in the opened position, a die 22 is exposed, allowing powered ram 10 to extrude solid carbon dioxide from inside chamber 24, through the die 22, to space outside of the chamber 24. The die 22 is attached to extruder 25 via releasable fasteners 3.

A computer controller 6 receives a continuous stream of information from sensors 26 and 8 which allows for precise control of the motion of powered ram 10 and the pressure within chamber 24.

In operation, the apparatus functions as follows: Liquid carbon dioxide is flashed into chamber 24 from reservoir 12, where it adiabatically expands into gaseous carbon dioxide and dry ice. With dagger board 22 in the closed position, the powered ram 10 is urged toward dagger board 22 using motor 4 and the associated hydraulic assembly contained in hydraulic tank 2. The dry ice in chamber 24 is thereby compacted into a dry ice block.

Simultaneously with the compaction of the dry ice, the gaseous carbon dioxide present in chamber 24 is vented from the chamber through outlet 18. Throughout the compaction cycle, the pressure within chamber 24 is monitored by sensor 26, and the position of the ram 10 is monitored by sensor 8.

Once the dry ice is compacted the desired amount, dagger board 20 is moved from the closed position to the opened position to expose die 22. The ram 10 is then used to extrude the compacted dry ice block through the die 22 to form any number of shapes and sizes of dry ice units. The dagger board 20 can be forcibly urged into the closed position by dagger board ram 28 during the extrusion of the dry ice to chop the extruded units to a desired length.

Figure 4:
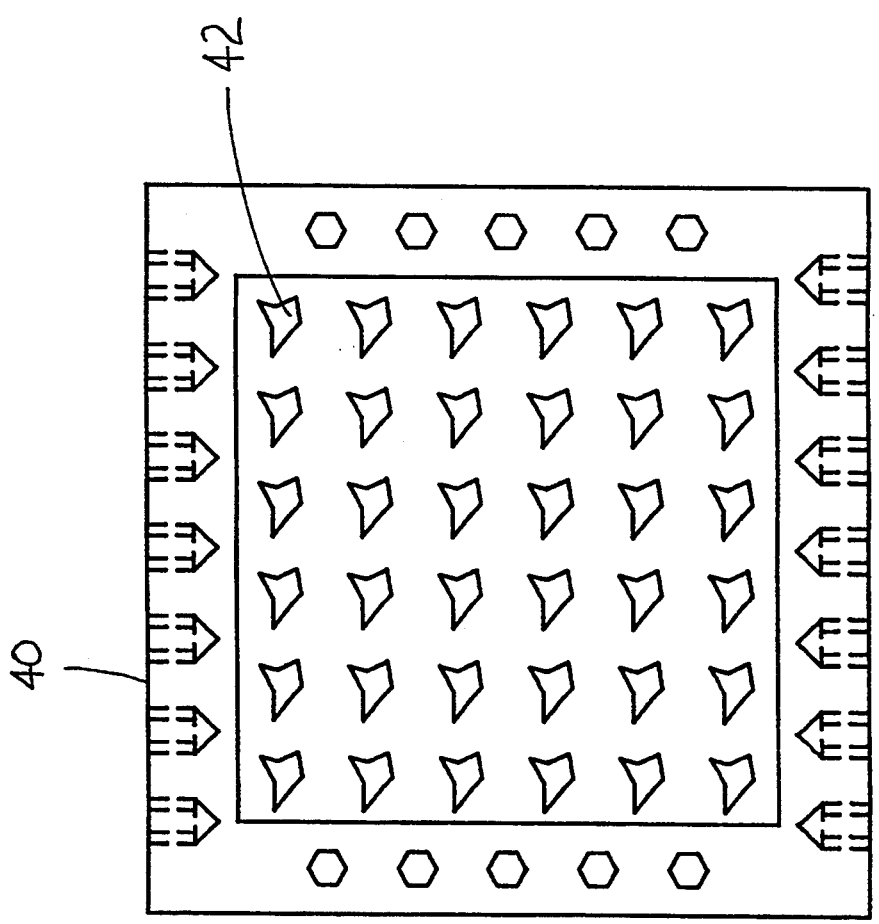
FIG. 4 depicts a cross-section of a die for forming pellets of extruded solid carbon dioxide.
Figure 3:
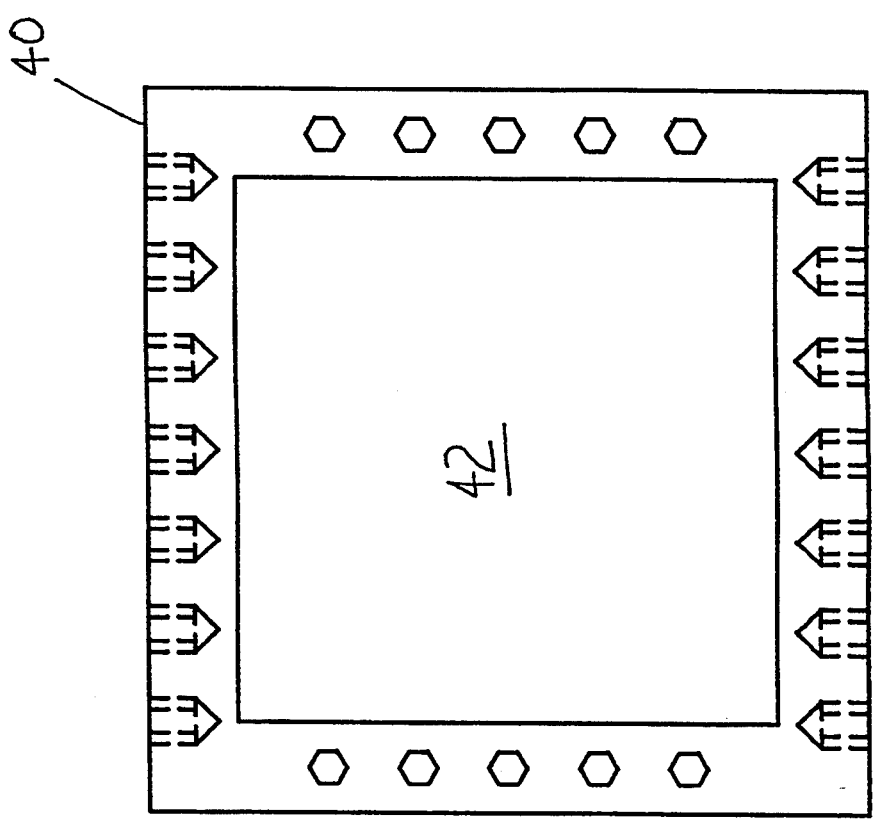
FIG. 3 depicts a cross-section of a die for forming blocks of extruded solid carbon dioxide.
Figure 5:
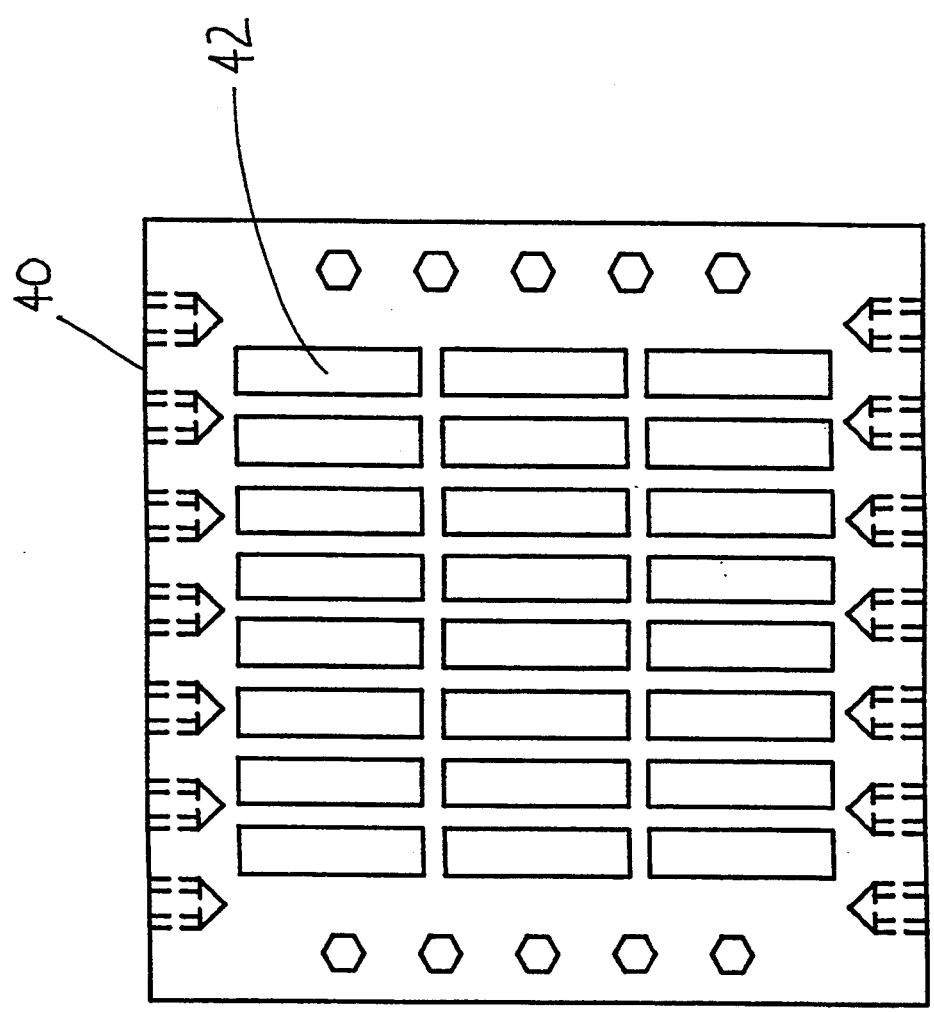
FIG. 5 depicts a cross-section of a die for forming sheets of extruded solid carbon dioxide.

Referring to FIGS. 3, 4, and 5, the die 22 includes a frame 40 having at least one opening therethrough 42. The die can be configured to form any geometric shape desired, including quadrilateral blocks, FIG. 3; pellets of regular or irregular geometries, FIG. 4; or sheets, FIG. 5. The length of the extruded dry ice unit can be altered using the cutting action of dagger board 20, described above.

Figure 2:
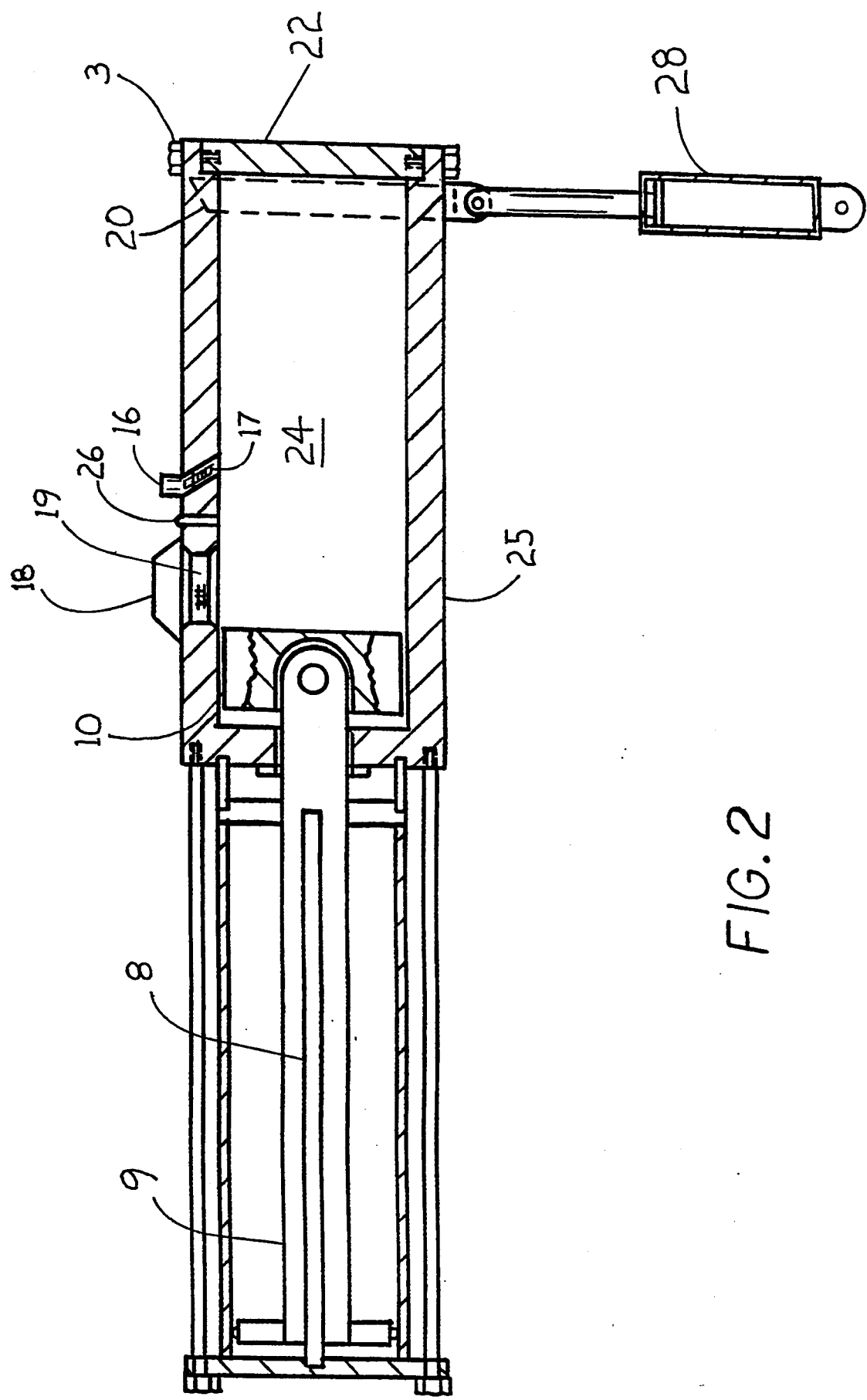
FIG. 2 is a front elevation sectional showing the extruder section of the present invention.

FIG. 2 depicts an isolated view of the extruder 25 of the present invention. In this preferred embodiment, three separate pressure sensors are in communication with chamber 24: a sensor 17 located in the chamber adjacent to inlet 16 to measure the pressure of the incoming liquid carbon dioxide, a sensor 26 located in the main cavity of the chamber to measure the pressure therein, and a sensor 19 located adjacent to the outlet 19 to measure the pressure of the gaseous carbon dioxide being vented from the chamber. Information from the three sensors, along with information from the LVDT is fed to the computer controller 6 (FIG. 1), to allow for precise control of the compaction and extrusion of the dry ice present in chamber 24.

Computer control of the compaction and extrusion of the dry ice blocks allows the compaction and extrusion cycles to be finely controlled to ensure that substantially all of the gaseous carbon dioxide is forced from the chamber 24 before it is trapped within the compacted dry ice. Information from the sensors within the chamber allow the inflow of liquid carbon dioxide, the rate of outflow, and the motion of the powered ram to be modified so as to produce a consistent density block of dry ice. The consistently dense block of dry ice formed during the compaction cycle is far less prone to fracturing during the extrusion process or immediately thereafter.

It is to be understood that the present invention is not limited to the sole embodiment described above, but encompasses any and all embodiments within the scope of the following claims.

I claim:

1. An apparatus for extruding solid carbon dioxide comprising:

a chamber adapted to confine carbon dioxide snow, said chamber having an opening therein;

an inlet into said chamber for flashing liquid carbon dioxide into said chamber, thereby filling said chamber with carbon dioxide snow and gas;

an outlet from said chamber for venting carbon dioxide gas from said chamber;

means for releasably engaging a dagger board adjacent to said opening, said dagger board movable between a first opened position and a second closed position, and wherein when said dagger board is in said second closed position, said dagger board defines a closure covering said opening in said chamber, and said dagger board further includes at least one sharpened edge capable of cutting solid carbon dioxide;

a powered ram slidably disposed within said chamber and capable of reciprocal motion therethrough;

a prime mover operationally connected to said powered ram;

at least one sensor capable of sensing pressure inside said chamber; and at least one sensor capable of sensing the linear motion of said powered ram.

2. The apparatus according to claim 1, wherein said at least one sensor capable of sensing the linear motion of said powered ram is a linear voltage distance transducer.

3. The apparatus according to claim 2, wherein said at least one sensor capable of sensing pressure within said chamber includes a first sensor located at said inlet and capable of measuring the pressure within said chamber at said inlet, a second sensor located at said outlet and capable of measuring the pressure within said chamber at said outlet, and a third sensor centrally located within said chamber and capable of measuring the pressure therein.

4. The apparatus according to claim 3, further comprising electronic computer controller means for controlling said apparatus for extruding solid carbon dioxide interfaced to said first, second, and third sensors, and said linear voltage distance transducer, said electronic computer controller means responsive to said first, second, and third sensors, and said linear voltage distance transducer.

5. The apparatus according to claim 4, wherein said dagger board is slidably engaged adjacent to said opening, and further comprising a powered piston connected to said dagger board, said powered piston capable of moving said dagger board from said first opened position to said second closed position, said powered piston being driven by said prime mover.

6. The apparatus according to claim 5, wherein said powered ram and said powered piston are hydraulically driven.

7. An apparatus for extruding solid carbon dioxide comprising:

a chamber adapted to confine carbon dioxide snow, said chamber having an opening therein;

an inlet into said chamber for flashing liquid carbon dioxide into said chamber, thereby filling said chamber with carbon dioxide snow and gas;

an outlet from said chamber for venting carbon dioxide gas from said chamber;

means for releasably engaging a dagger board adjacent to said opening, said dagger board movable between a first opened position and a second closed position, and wherein when said dagger board is in said second closed position, said dagger board defines a closure covering said opening in said chamber, and said dagger board further includes at least one sharpened edge capable of cutting solid carbon dioxide;

a powered ram slidably disposed within said chamber and capable of reciprocal motion therethrough;

a prime mover operationally connected to said powered ram;

at least one sensor capable of sensing pressure inside said chamber;

at least one sensor capable of sensing the linear motion of said powered ram;

at least one releasable fastener adjacent to said opening; and a die releasably fastened adjacent to said opening by said at least one releasable fastener, said die movably engageably with said dagger board.

8. The apparatus according to claim 7, wherein said at least on sensor capable of sensing the linear motion of said powered ram is a linear voltage distance transducer.

9. The apparatus according to claim 8, wherein said at least one sensor capable of sensing pressure within said chamber includes a first sensor located at said inlet and capable of measuring the pressure within said chamber at said inlet, a second sensor located at said outlet and capable of measuring the pressure within said chamber at said outlet, and a third sensor centrally located within said chamber and capable of measuring the pressure therein.

10. The apparatus according to claim 9, further comprising electronic computer controller means for controlling said apparatus for extruding solid carbon dioxide interfaced to said first, second, and third sensors, and said linear voltage distance transducer, said electronic computer controller means responsive to said first, second, and third sensors, and said linear voltage distance transducer.

11. The apparatus according to claim 10, wherein said dagger board is slidably engaged adjacent to said opening, and further comprising a powered piston connected to said dagger board, said powered piston capable of moving said dagger board from said first opened position to said second closed position, said powered piston being driven by said prime mover.

12. The apparatus according to claim 11, wherein said powered ram and said powered piston are hydraulically driven.

13. The apparatus according to claim 7, wherein said die is dimensioned and configured to form blocks of solid carbon dioxide.

14. The apparatus according to claim 7, wherein said die is dimensioned and configured to form sheets of solid carbon dioxide.

15. The apparatus according to claim 7, wherein said die is dimensioned and configured to form pellets of solid carbon dioxide.

* * * * *